United States Patent
Gennaro et al.

(10) Patent No.: US 6,578,144 B1
(45) Date of Patent: Jun. 10, 2003

(54) SECURE HASH-AND-SIGN SIGNATURES

(75) Inventors: Rosario Gennaro, Bronx, NY (US); Shai Halevi, Hartsdale, NY (US); Tal Rabin, Riverdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/274,525

(22) Filed: Mar. 23, 1999

(51) Int. Cl.$^7$ .............................. H04L 9/30; H04L 9/32; G06F 7/38
(52) U.S. Cl. ................. 713/176; 713/170; 713/181; 380/30; 708/605; 708/606
(58) Field of Search ................ 713/170, 176, 713/177, 181; 705/64, 69, 68; 380/30; 708/136, 605, 606

(56) References Cited

U.S. PATENT DOCUMENTS 5,796,833 A * 8/1998 Chen et al. ................. 380/278

FOREIGN PATENT DOCUMENTS

EP 0 772 165 A2 * 5/1997 ............. G07F/7/10

OTHER PUBLICATIONS

"Digital Signature and Public Key Cryptosystem in a Prime Order Subgroup of Z*n", C. Boyd, Info. Sec. Res. Ctr., School of Data Communications, Queensland University of Technology, Brisbane Q4001, Australia. Proc. ICICS'97, 1997.

"On the Security of some Variants of the RSA Signature Scheme", M. Michels, M. Stadler and H–M. Sun, Dept. of Information Management, Chao Yang University of Technology, Wufend, Taichung County, Taiwan 413.

* cited by examiner

Primary Examiner—Justin T. Darrow
(74) Attorney, Agent, or Firm—Louis P. Herzberg

(57) ABSTRACT

This invention is a method and apparatus which provide a solution to the problem of constructing efficient and secure digital signature schemes. It presents a signature scheme that can be proven to be existentially unforgeable under a chosen message attack, assuming a variant of the RSA conjecture. This scheme is not based on "signature trees", but instead it uses a "hash-and-sign" paradigm, while maintaining provable security. The security proof is based on well-defined and reasonable assumptions made on the cryptographic hash function in use. In particular, it does not model this function as a random oracle. The signature scheme which is described in this invention is efficient. Further, it is "stateless", in the sense that the signer does not need to keep any state, other than the secret key, for the purpose of generating signatures.

60 Claims, 4 Drawing Sheets

SECURE HASH-AND-SIGN SIGNATURES

FIELD OF THE INVENTION

The present invention is directed to the field of secure communications. It is more particularly related to secure digital signature schemes.

BACKGROUND OF THE INVENTION

With today's exponential growth in the volume of electronic communications, there is a need for cryptographic tools that offer high security as well as high efficiency. Communication networks todays must support exchange of sensitive information (e.g., medical files), remote access of data, electronic commerce, and a variety of other tasks. At the very least, the network is expected to ensure integrity and authenticity of data, and often also confidentiality.

When a message is transmitted from one party to another, the receiving party may desire to determine whether the message has been altered in transit. Furthermore, the receiving party may which to be certain of the origin of the message. Traditionally, written data has been authenticated by appending the hand-written signature of the appropriate individual to the data. In the realm of electronic communication, methods for authenticating data proceed in a similar fashion, except that the hand-written signature is replaced with a digital signature. The digital signature is computed by the signer based on the message being signed.

The digital signature should have the properties that anyone can verify that a signature is the valid signature of the signer for the associated message, and that only the signer is able to generate the signature. Hence, digital signature methods may also be used to prove to a third party that the message was signed by the actual signer, thus providing non repudiation.

A typical system wherein a sender is using a digital signature scheme to authenticate messages that it sends to a receiver is depicted in FIG. 1. In this figure, a dashed line separates the operations of a sender 100 on the left from the operation of a receiver 110 on the right. In a preliminary operation, the sender 100 uses a key generation process 101 to generate a public key 102 and a secret key 103. The public key 102 is made available to the receiver 110 before any message is sent using some mechanism. Mechanisms to supply the public key to the receiver 110 are well known in the art, and are not discussed in this patent. The secret key 103 is kept secret by the sender 100.

To authenticate a message 104, the sender 100 uses a signing process 105, giving it as input the message 104 and the secret key 103. The output of the signing process 105 is a signature 106 on the message 104. The sender 100 uses conventional communication equipment to transmit both the message 104 and the signature 106 to the receiver 110. The receiver 110 uses a verification process 107, giving it as input the public key 102, the message 104 and the signature 106. The output of the verification process 107 signifies that the signature is valid 108, or that an invalid signature has been detected.

Several digital signature methods are known in the art. The most popular method today for computing digital signatures in the RSA scheme. The strongest notion of security of digital signatures is called existential unforgeability under an adaptive chosen message attack. It requires that forging a signature of an arbitrary message without knowing the secret key is not feasible, even if an attacker receives several signatures on messages of its choice. Construction of efficient signature schemes for which it is possible to prove existential unforgeability under an adaptive chosen message attack is a long standing challenge. Prior to the present invention, the only schemes for which such proofs are known were based on "signature trees", and were not very efficient. Another drawback of these prior schemes is their stateful nature, i.e. the signer has to store some information from previously signed messages.

Another line of research concentrates on hash-and-sign schemes, wherein the message to be signed is hashed using a cryptographic hash function. The result is signed using a standard signature scheme such as RSA. The current standard for RSA signatures is based on the hash-and-sign approach. Although hash-and-sign schemes are very efficient, they only enjoy a heuristic level of security. The only known security proofs for hash-and-sign schemes are carried out in a model wherein the hash function is assumed to be an "ideal" one. Specifically, in these proofs the hash function is replaced by a random oracle.

SUMMARY OF THE INVENTION

It is thus an object of the present invention to provide a digital signature scheme that can be proven secure without using the random-oracle heuristic. Instead, the security proof is based on well-defined and constructable properties that are required from the hash function in use.

Another object of the invention is to provide a signature scheme which is efficient. Specifically, it should follow the hash-and-sign paradigm, by which a message is first hashed using a cryptographic hash function, and then signed using a few simple algebraic operations.

Yet another object of the invention is to provide a signature scheme in which the signer does not need to keep any state (other than the secret key) for the purpose of generating signatures.

These and other objects are provided in a digital signature scheme wherein the signature of a message relative to a public key is computed by means of a secret key. Other objects and a better understanding of the invention may be realized by referring to the Detailed Description.

BRIEF DESCRIPTION OF THE DRAWINGS

These and other objects, features, and advantages of the present invention will become apparent upon further consideration of the following detailed description of the invention when read in conjunction with the drawing figures, in which.

DESCRIPTION OF THE INVENTION

Figure 1:
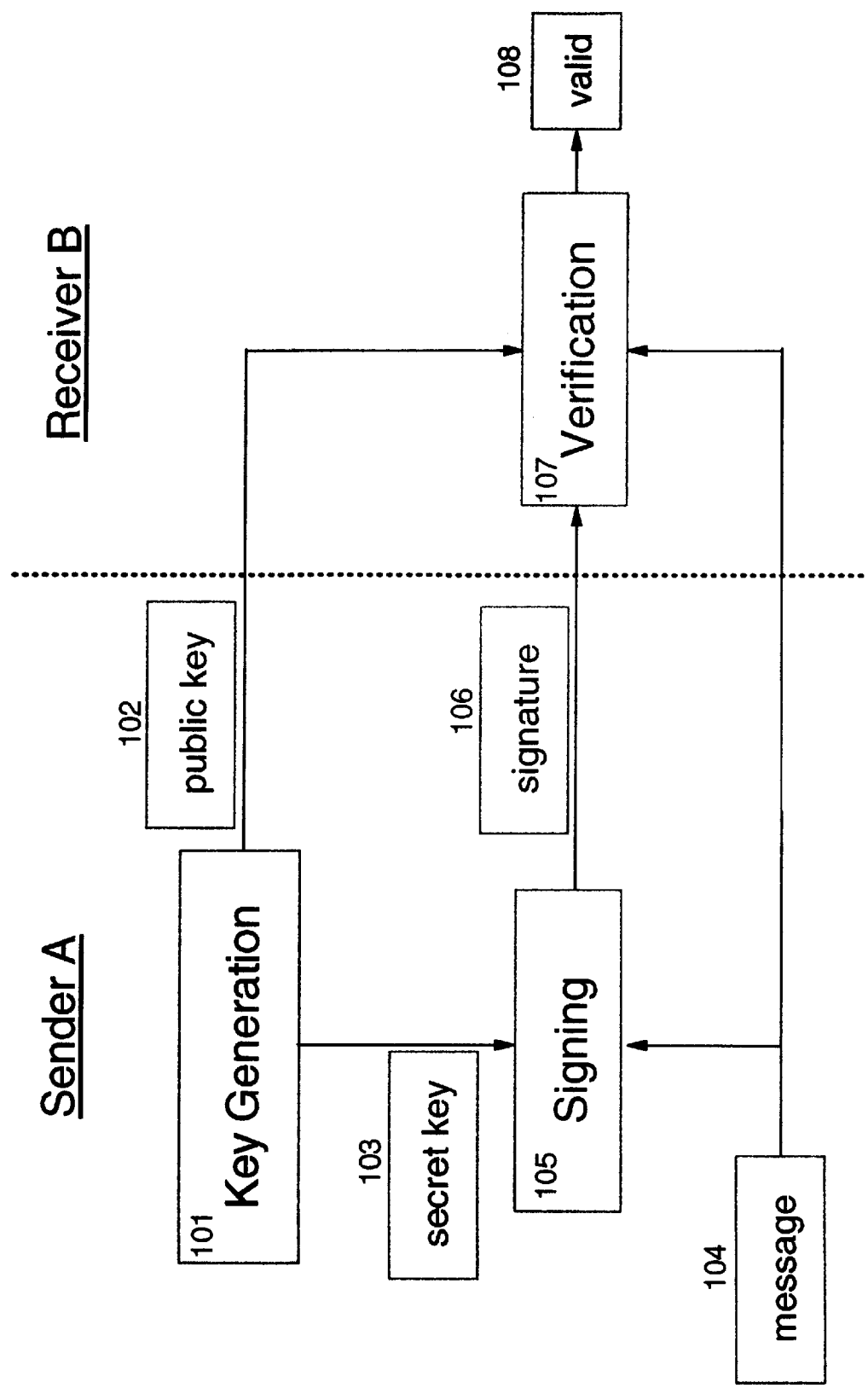
FIG. 1 shows a typical system in which the signature scheme is used to authenticate messages between a sender and a receiver.

The present invention provides methods and apparatus for generating pairs of secret and public keys, and for generating and verifying digital signatures with respect to these keys.

The methods use a "cryptographic hash function" H, which may be common to all users. This hash function H maps bit strings of arbitrary length into bit strings of some fixed length. The term "a cryptographic hash function" is used by those skilled in the art to refer to a hash function that has additional cryptographic properties. For example, it is often used to describe a function wherein it is not feasible to find a matching input for a given output, or to find two different inputs that yield the same output. As example of a cryptographic hash function is the SHA1 function, as described by National Institute for Standards and Technology Secure Hash Standard. FIPS 180-1, Apr. 17, 1995.

In some embodiments the hash function is randomized. We write H(R;M)=Y, wherein M is an arbitrary string, R is the random value used in computing H, and Y is the output of H on input M and random value R. In an embodiment of the present invention, we use hash functions with the special property that their output is always an odd integer. Such a function can be easily obtained from an arbitrary hash function by setting H'(M)=H(M)1 (or just setting the lowest bit of H(M) to one).

We also assume that H is such as to be division-intractable. A division-intractable hash function is a function wherein it is not feasible to find inputs $M_1, \ldots M_n$, M and random values $R_1, \ldots R_n$, R, such that $M \neq M_i$ for all i, and yet H(R;M) divides the product of the $H(R_i;M_i)$'s. The output length of H must be large enough so that it is division-intractable. Presently, this is satisfied when H has at least 512 bits. As a concrete implementation of such a hash function, we use the function SHA1 in the following mode.

The random value consists of four 256-bit blocks, R=$R_1$ $R_2$ $R_3$ $R_4$ (where " " denotes concatenation).

To compute H(R;M) we set $$T_1 = SHA1(M);$$

and $$T_2 = SHA1(T_1R_1) \; SHA1(T_1R_2) \; SHA1(T_1R_3) \; SHA1(T_1R_4),$$

and then define H(R;M) to be equal to $T_2$, with the most and least significant bits set to 1. Hence the output length of H is 640 bits.

For the purpose of the signature method in this patent, alternate embodiments may use any other construction of a division intractable hash function.

The signature method itself consists of three processes: a key generation process, a signing process, and a verification processes.

Key Generation Process. To generate public and secret keys, two large primes p,q of the same length are chosen, and an RSA modulus is computed as n=pq. The length of p,q should be set so that factoring the composite n is not feasible. For example, one can choose both p,q as 512-bit primes. We also assume that p,q are chosen as safe or quasi-safe primes. This is satisfied when (p−1)/2 and (q−1)/2 are either primes or primer-powers, respectively. This condition implies that p−1, q−1 do not have any small primer factors (other than 2), and that finding an odd integer which is not co-prime with $$\phi(n) = (p-1)(q-1)$$

is as hard as factoring n. Methods for choosing safe and quasi-safe primes are well known in the art. In embodiments of the present invention this process is randomized. After the modulus n is set, an element s is chosen at random from the set $Z_n^*$ (of all numbers between 1 and n−1 that are co-primes with n). The public key is the pair (n,s), and the secret key is the pair of primes (p,q).

Figure 2:
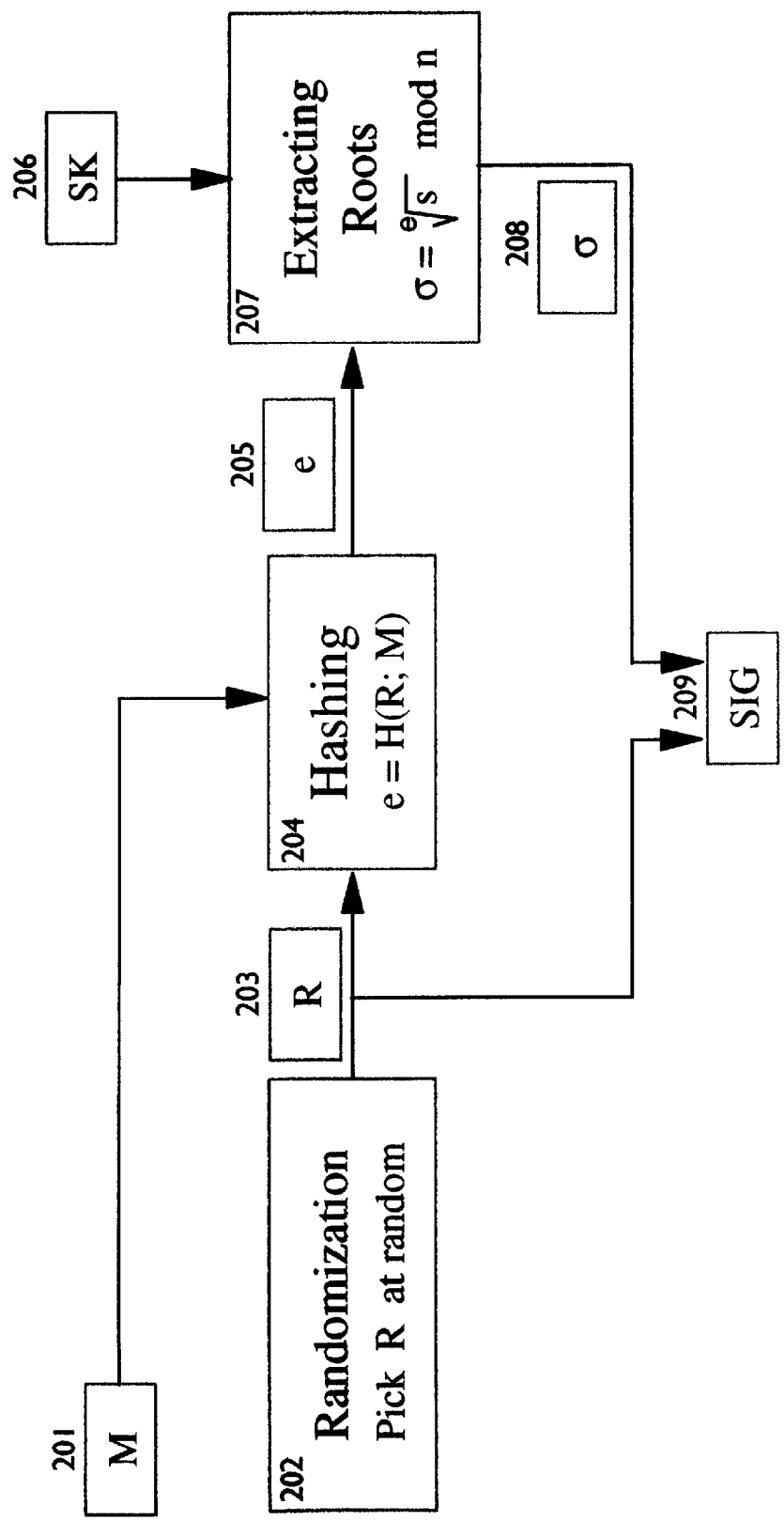
FIG. 2 shows an example of the main components of the signing process in accordance with the present invention.

Signing Process. A typical signing process is depicted in FIG. 2. To sign a message M 201, the signer invokes a randomization sub-process 202, to generate a random value R 203, which is needed for the hash function. Then a hashing sub-process 204 is applied to the message M 201 and the random value R 203, producing a first hashed value e 205 (which must be an odd integer). In some embodiments this process is not randomized.

Next, a root-extraction sub-process 207 is invoked, by which the secret key SK is used to find the e'th root of the element s modulo n (where (s,n) are the two components of the public key, as was described above). This root is denoted σ 208. An implementation of the root-extraction sub-process, is to first compute the multiplicative inverse of e modulo $\phi(n)$, $d=e^{-1}$ mod $\phi(n)$ is Euler's totient function applied to the RSA modulus n). Methods for finding multiplicative inverses modulo $\phi(n)$ given the prime factors of n are well known in the art. Once d is computed, a standard modular exponentiation is used to compute the root as $\sigma = s^d$ mod n. The signature SIG 209 on the message M 201 consists of the random value R 203 and the root σ 210.

Figure 3:
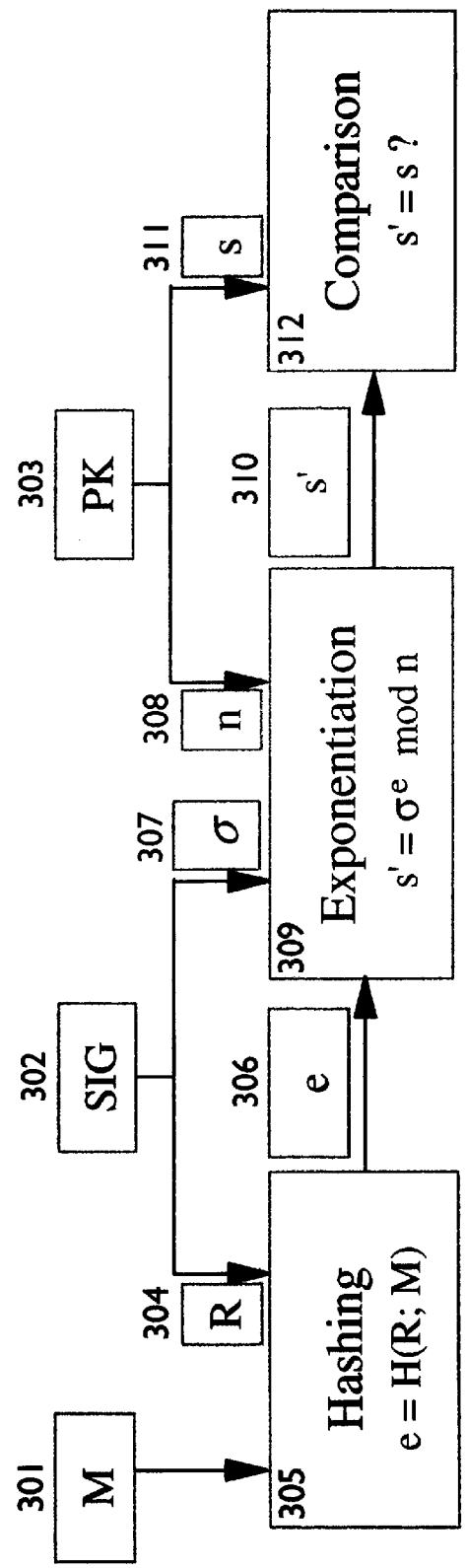
FIG. 3 shows an example of the main components of the verification process in accordance with the present invention.

Verification Process. A typical verification process is depicted in FIG. 3. To verify a signature SIG 302 on message M 301 with respect to public key PK 303, the receiver applies a hashing sub-process 305 to the message M 301 and the random value R 304 (which is part of the signature SIG 302), producing a second hashed value e' 306, which is an odd integer. Then, an exponentiation sub-process 308 is used, which takes as input e' 304, σ 305 (which is part of the signature SIG 302), and the RSA modulus n 307 (which is part of the public key PK 303), and computes an element $s' = \sigma^{e'}$ mod n. The element s' 310 is then compared to the element s 311 (which is part of the public key PK 303). The signature is deemed valid if the two elements are equal, and it is invalid otherwise.

An optimization. An advantageous method for implementing the modular exponentiation in both the signing and the verification processes, is to take advantage of the fact that the base of the exponent is always the same element s (which is part of the public key). Therefore, some of the work involved in the modular exponentiation can be done ahead of time. For example, in some embodiments it is beneficial to pre-compute the powers of s, $s^2$ mod n, $s^4$ mod, n, $s^8$ mod n, etc. and store them in a table. Then, to exponentiate s to some power, it is enough to choose the right entries from the precomputed table and multiply them modulo n.

The present invention may also be provided as an article of manufacture. In an example embodiment, the article includes a computer usable medium having computer readable program code means embodied therein for causing generation of a digital signature for a string of bits. The computer readable program code means in the article of manufacture is comprised of computer readable program code means for causing a computer to effect: generating a pair of keys which includes a secret key and a public key; producing a first hashed value by hashing the string of bits, utilizing a division intractable hash function; and forming a signature using the first hashed value together with the secret key, and/or effect further steps described above for the method of the present invention.

Thus in an example embodiment, the computer readable program code means in the article of manufacture further comprises computer readable program code means for causing a computer to effect using components of an RSA signature scheme. The step of generating includes choosing an RSA modulus n=pq, and a random element, s, in $Z_n^*$, wherein p,q, are chosen as large prime integers are kept secret.

In a further embodiment of the article of manufacture, the step of producing is randomized, and/or the step of producing uses a cryptographic hash function.

Hence, is an example embodiment, the step of producing includes computing a first temporary value $T_1$, as $T_1$=SHA1(M);

choosing four random strings ($R_1$, $R_2$, $R_3$, and $R_4$), each having 256 bits; computing a second temporary value $T_2$, where $T_2$=SHA1($T_1R_1$) SHA1($T_1R_2$) SHA1($T_1R_3$) SHA1($T_1R_4$);

resetting the first and last bit of $T_2$ to one, and setting the first hashed value to equal $T_2$. Generally, the signature includes the random values used in the step of producing.

In a further embodiment of the article of manufacture, the step of forming a signature includes extracting the $e^{th}$ root of s modulo n, $\sigma=e\sqrt{s}$ mod n, where e is the first hashed value, and when the signature thus formed includes the root $\sigma$; and/or the step of extracting the $e^{th}$ root includes employing inversion and exponentiation; and/or the step of extracting the $e^{th}$ root includes: finding a multiplicative inverse of e modulo $\phi(n)$, $d=e^{-1}$ mod $\phi(n)$, and computing $\sigma=s^d$ mod n.

In a further embodiment of the article of manufacture, the computer readable program code means in the article of manufacture further comprising computer readable program code means for causing a computer to effect verifying the signature. The step of verifying often includes: reproducing a second hashed value by hashing the string of bits, utilizing the division intractable hash function; and checking a validity of the signature using the second hashed value and the public key.

In a further embodiment of the article of manufacture, the computer readable program code means in the article of manufacture further comprising computer readable program code means for causing a computer to effect verifying the signature. The step of verifying generally includes: reproducing a second hashed value by hashing the string of bits, utilizing the division intractable hash function, using the random values that are included in the signature; and checking a validity of the signature using the second hashed value and the public key.

The present invention may also be provided as a computer program product comprising a computer usable medium having computer readable program code means embodied therein for causing generating of a digital signature for a string of bits. The computer readable program code means in the computer program product comprising computer readable program code means for causing a computer to effect: generating a pair of keys which includes a secret key and a public key; producing a first hashed value by hashing the string of bits, utilizing a division intractable hash function; and forming a signature using the first hashed value together with the secret key; and/or effect further steps described above for the method of the present invention.

The present invention may also be provided as an article of manufacture comprising a computer usable medium having computer readable program code means embodied therein for causing authentication of a message. The computer readable program code means in the article of manufacture comprising computer readable program code means for causing a computer to effect: a signer; generating a pair of keys which include a public key and a private key; communicating the public key to an intended receiver of the message; forming a signature for the message by: producing a hashed value by hashing the message, utilizing a division intractable hash function, using the hashed value together with the secret key to form the signature, and sending the message and signature to the receiver, and/or effect further steps described above for the method of the present invention.

Thus, in an embodiment of the article of manufacture, the computer readable program code means in the article of manufacture further comprises computer readable program code means for causing a computer to effect the receiver checking a validity of the signature using the public key and the message, and/or effect further features described above for the method of the present invention.

The present invention may also be provided as a computer program product comprising a computer usable medium having computer readable program code means embodied therein for causing generation of a digital signature for a string of bits. The computer readable program code means in the computer program product comprising computer readable program code means for causing a computer to effect: generating a public key PK and a secret key SK; employing a division intractable hash function H to has a message M to be signed, thereby obtaining a hashed value e=H(M); and signing the value e with respect to the public key PK using the secret key SK; and/or effect further steps described above for the method of the present invention.

The present invention may also be provided as a computer program product comprising a computer usable medium having computer readable program code means embodied therein for causing construction of a digital signature for a string of bits, the computer readable program code means in the computer program product comprising computer readable program code means for causing a computer to effect: generating a public key having an RSA modulus of n=pq, and a random element, s, in $Z_n^*$, wherein p,q, are chosen as large prime integers and kept secret; a signer applying a division intractable hash function to compute a first hashed value e=H(M); and the signer using the first hash value e as an exponent, by finding the $e^{th}$ root of s modulus n, such as to form the signature on M being an integer, $\sigma$, such that $\sigma^e$=s mod n. Generally, the signer does not have to keep any state information other than the secret key.

The present invention may also be provided as a program storage device readable by machine, tangibly embodying a program of instructions executable by the machine to perform method steps for verifying if a message M and a signature $\sigma$ are authentic with respect to a public key (n,s). The method steps comprising: a receiver of the message applying a division intractable hash function to compute a hashed value e'=H(M); and the receiver declaring the message to be verified if $\sigma^{e'}$=s mod n; and/or effect further steps described above for the method of the present invention.

Figure 4:
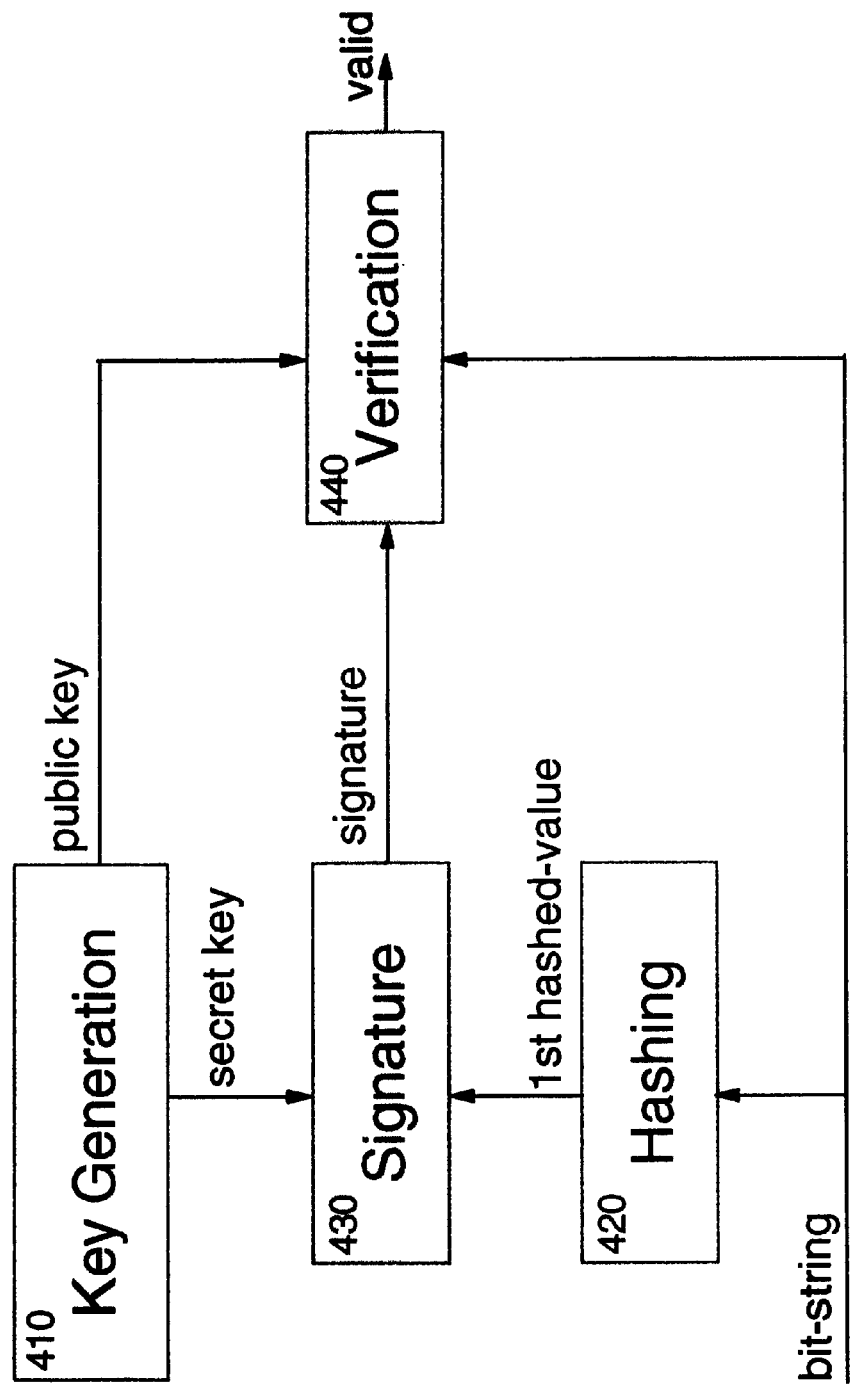
FIG. 4 shows an example of an apparatus used to implement the present invention.

The present invention may also be provided as an apparatus for generating a digital signature for a string or bits. An example information of the apparatus is shown in FIG. 4. FIG. 4 shows the apparatus to include: a generator module 410 to generate a pair of keys which includes a secret key and a public key; a hashing module 420 to produce a first hash value by hashing the string of bits, utilizing a division intractable hash function; and a signature module 430 to form a signature using the first hashed value together with the secret key. Each module generally implements control functions for interoperating with each other module. The apparatus may further implement the steps described above for the method of the present invention.

Thus, for example, in an embodiment of the apparatus at least one of the modules uses components of an RSA signature scheme; and/or implement the step of generating includes choosing an RSA modulus n=pq, and a random element, s, in $Z_n^*$, wherein p,q, are chosen as large prime integers and kept secret; and/or the hashing module 420 uses random values; and/or the hashing module 420 includes components to: compute a first temporary value $T_1$, as $T_1$=SHA1(M); choose four random string ($R_1$, $R_2$, $R_3$, and $R_4$), each having 256 bits; compute a second temporary value $T_2$, where $$T_2=SHA1(T_1R_1)\ SHA1(T_1R_2)\ SHA1(T_1R_3)\ SHA1(T_1R_4);$$

reset the first and last bit of $T_2$ to one, and set the first hashed value to equal $T_2$; and/or the signature module 430 forms a signature by extracting the $e^{th}$ root of s modulo n, $\sigma=e\sqrt{s}$ mod n, where e is the first hashed value, such that the signature includes the root $\sigma$; and/or the signature module 430 performs extracting the $e^{th}$ root by finding a multiplicative inverse of e modulo $\phi(n)$, $d=e^{-1}$ mod $\phi(n)$, and computing $\sigma=s^d$ mod n.

In an embodiment, the apparatus further comprises a verifier module 440 to verify the signature. The verifier module 440 verifies the signature by: reproducing a second hashed value by hashing the string of bits, utilizing the division intractable hash function; and checking a validity of the signature using the second hashed value and the public key; and/or verifies the signature by: reproducing a second hashed value by hashing the string of bits, utilizing the division intractable hash function; and checking a validity of the signature using the second hashed value and the public key; and/or performs checking by: computing a value $s'=\sigma^{e'}$ mod n, where e' is the second hashed value; comparing s' to s; and declaring the signature to be valid if s' is equal to s.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

Having thus described our invention, what we claim as new and desire to secure by Letters Patent is as follows:

1. A method for generating a digital signature for a message, the method comprising:
    generating a pair of keys which includes a secret key and a public key;
    producing a first hashed value by hashing the message, utilizing a division intractable hash function; and
    forming a signature using the first hashed value together with the secret key.

2. A method as recited in claim 1, including using components of an RSA signature scheme.

3. A method as recited in claim 1, wherein the step of generating includes choosing an RSA modulus n=pq, and a random element, s, in $Z_n^*$, wherein p,q, are chosen as large prime integers and kept secret.

4. A method as in claim 3, wherein p,q are chosen such that (p−1)/2 and (q−1)/2 are also primes.

5. A method as in claim 3, wherein p,q are chosen such that (p−1)/2 and (q−1)/2 are prime powers.

6. A method as recited in claim 1, wherein the step of producing is randomized using random values.

7. A method as recited in claim 6, wherein the step of producing uses a cryptographic hash function.

8. A method as recited in claim 7, wherein the step of producing includes
    computing a first temporary value $T_1$, as $T_1$=SHA1(M), where M is the message to be signed;
    choosing four random strings ($R_1$, $R_2$, $R_3$, and $R_4$), each having 256 bits;
    computing a second temporary value $T_2$, where $$T_2=SHA1(T_1|R_1)|SHA1(R_1|R_2)|SHA1(T_1|R_3)|SHA1(T_1|R_4);$$

resetting the first and last bit of $T_2$ to one, and
    setting the first hashed value to equal $T_2$.

9. A method as recited in claim 6, wherein the signature includes the random values used in the producing step.

10. A method as recited in claim 3, wherein the step of forming a signature includes extracting the $e^{th}$ root of s modulo n, $\sigma=e\sqrt{s}$ mod n, where e is the first hashed value, and when the signature thus formed includes the root $\sigma$.

11. A method as in claim 10, wherein the step of extracting the $e^{th}$ root includes employing inversion and exponentiation.

12. A method as in claim 10, wherein the step of extracting the $e^{th}$ root includes:
    finding a multiplicative inverse of e modulo $\phi(n)$, $d=e^{-1}$ mod $\phi(n)$, and
    computing $\sigma=s^d$ mod n.

13. A method as recited in claim 1, further comprising verifying the signature.

14. A method as recited in claim 13, wherein the step of verifying includes:
    reproducing a second hashed value by hashing the message, utilizing the division intractable hash function; and
    checking validity of the signature using the second hashed value and the public key.

15. A method as recited in claim 9, further comprising verifying the signature, wherein the step of verifying includes:
    reproducing a second hashed value by hashing the message, utilizing the division intractable hash function, using the random values that are included in the signature; and
    checking a validity of the signature using the second hashed value and the public key.

16. A method as recited in claim 10, further comprising verifying the signature, wherein the step of verifying includes:
    reproducing a second hashed value by hashing the message, utilizing the division intractable hash function; and
    checking a validity of the signature using the second hashed value and the public key.

17. A method as recited in claim 16, wherein the step of checking includes exponentiation and comparing.

18. A method as recited in claim 16, wherein the step of checking includes:
    computing a value $s'=\sigma^{e'}$ mod n, where e' is the second hashed value;
    comparing s' to s; and
    declaring the signature to be valid if s' is equal to s.

19. A method as recited in claim 13, further comprising employing the signature for authentication of the message to be signed.

20. A method as recited in claim 13, further comprising employing the signature for non-repudiation of the message to be signed.

21. A method as recited in claim 13, further comprising:
authenticating a financial transaction using the signature, and
providing non-repudiation of components of the financial transaction.

22. A method for authenticating a message, comprising:
a signer;
generating a pair of keys which includes a public key and a private key;
communicating the public key to an intended receiver of the message;
forming a signature for the message by:
producing a hashed value by hashing the message, utilizing a division intractable hash function, and using the hashed value together with the private key to form the signature; and
sending the message and signature to the receiver.

23. A method as recited in claim 22, further comprising the receiver checking a validity of the signature using the public key and the message.

24. A method for constructing a digital signature, the method comprising:
generating a public key PK and a secret key SK;
employing a division intractable hash function H to hash a message M to be signed, thereby obtaining a hashed value e=H(M); and
signing the value e with respect to the public key PK using the secret key SK.

25. A method for constructing a digital signature, the method comprising:
generating a public key having an RSA modulus of n=pq, and a random element, s, in $Z_n^*$, wherein p,q, are chosen as large prime integers and kept secret;
a signer applying a division intractable hash function to compute a first hashed value e=H(M), where M is representative of a message; and
the signer using the first hashed value e as an exponent, by finding the $e^{th}$ root of s modulo n, such as to form the signature on M being an integer, σ, such that $\sigma^e$=s mod n.

26. A method as recited in claim 25, wherein p,q are chosen as safe primes.

27. A method as recited in claim 25, wherein p,q are chosen as quasi safe primes.

28. A method as recited in claim 25, wherein the signer does not have to keep any state information other than the secret key.

29. A method for verifying if a message M and a signature σ are authentic with respect to a public key (n,s), the method comprising:
a receiver of the message applying a division intractable hash function to compute a hashed value e'=H(M); and
the receiver declaring the message to be verified if $\sigma^{e'}$=s mod n.

30. An article of manufacture comprising a computer usable medium having computer readable program code means embodied therein for causing generation of a digital signature for a message, the computer readable program code means in said article of manufacture comprising computer readable program code means for causing a computer to effect:
generating a pair of keys which includes a secret key and a public key;
producing a first hashed value by hashing the message, utilizing a division intractable hash function; and
forming a signature using the first hashed value together with the secret key.

31. An article of manufacture as recited in claim 30, the computer readable program code means in said article of manufacture further comprising computer readable program code means for causing a computer to effect using components of an RSA signature scheme.

32. An article of manufacture as recited in claim 30, wherein the step of generating includes choosing an RSA modulus n=pq, and a random element, s, in $Z_n^*$, wherein p,q, are chosen as large prime integers and kept secret.

33. An article of manufacture as recited in claim 30, wherein the step of producing is randomized using random values.

34. An article of manufacture as recited in claim 33, wherein the step of producing uses a cryptographic hash function.

35. An article of manufacture as recited in claim 34, wherein the step of producing includes
computing a first temporary value $T_1$, as $T_1$=SHA1(M), where M is the message to be signed;
choosing four random strings ($R_1$, $R_2$, $R_3$, and $R_4$), each having 256 bits;
computing a second temporary value $T_2$, where $$T_2=\text{SHA1}(T_1|R_1)|\text{SHA1}(T_1|R_2)|\text{SHA1}(T_1|T_3)|\text{SHA1}(T_1|T_4);$$

resetting the first and last bit of $T_2$ to one; and
setting the first hashed value to equal $T_2$.

36. An article of manufacture as recited in claim 34, wherein the signature includes the random values used in the step of producing.

37. An article of manufacture as recited in claim 33, the computer readable program code means in said article of manufacture further comprising computer readable program code means for causing a computer to effect verifying the signature, wherein the step of verifying includes:
reproducing a second hashed value by hashing the message, utilizing the division intractable hash function, using the random values that are includes in the signature; and
checking a validity of the signature using the second hashed value and the public key.

38. An article of manufacture as recited in claim 32, wherein the step of forming a signature includes extracting the $e^{th}$ root of s modulo n, $\sigma=e\sqrt{s}$ mod n, where e is the first hashed value, and when the signature thus formed includes the root σ.

39. An article of manufacture as recited in claim 38, wherein the step of extracting the $e^{th}$ root includes employing inversion and exponentiation.

40. An article of manufacture as recited in claim 38, wherein the step of extracting the $e^{th}$ root includes:
finding a multiplicative inverse of e modulo φ(n), $d=e^{-1}$ mod φ(n), and
computing $\sigma=s^d$ mod n.

41. An article of manufacture as recited in claim 30, the computer readable program code means in said article of manufacture further comprising computer readable program code means for causing a computer to effect verifying the signature.

42. An article of manufacture as recited in claim 41, wherein the step of verifying includes:
reproducing a second hashed value by hashing the message, utilizing the division intractable hash function; and checking a validity of the signature using the second hashed value and the public key.

43. A computer program product comprising a computer usable medium having computer readable program code means embodied therein for causing generation of a digital signature for a message, the computer readable program code means in said computer program product comprising computer readable program code means for causing a computer to effect:
   generating a pair of keys which includes a secret key and a public key;
   producing a first hashed value by hashing the message, utilizing a division intractable hash function; and
   forming a signature using the first hashed value together with the secret key.

44. An article of manufacture comprising a computer usable medium having computer readable program code means embodied therein for causing authentication of a message, the computer readable program code means in said article of manufacture comprising computer readable program code means for causing a computer to effect:
   a signer;
      generating a pair of keys which include a public key and a private key;
      communicating the public key to an intended receiver of the message;
      forming a signature for the message by:
         producing a hashed value by hashing the message, utilizing a division intractable hash function, and
         using the hashed value together with the private key to form the signature; and
      sending the message and signature to the receiver.

45. An article of manufacture as recited in claim 44, the computer readable program code means in said article of manufacture further comprising computer readable program code means for causing a computer to effect the receiver checking a validity of the signature using the public key and the message.

46. A computer program product comprising a computer usable medium having computer readable program code means embodied therein for causing generation of a digital signature for a message, the computer readable program code means in said computer program product comprising computer readable program code means for causing a computer to effect:
   generating a public key PK and a secret key SK;
   employing a division intractable hash function H to hash a message M to be signed, thereby obtaining a hashed value e=H(M); and
   signing the value e with respect to the public key PK using the secret key PK.

47. A computer program product comprising a computer usable medium having computer readable program code means embodied therein for causing construction of a digital signature for a message, the computer readable program code means in said computer program product comprising computer readable program code means for causing a computer to effect:
   generating a public key having an RSA modulus of n=pq, and a random element, s, in $Z_n^*$, wherein p,q, are chosen as large prime integers and kept secret;
   a signer applying a division intractable hash function to computer a first hashed value e=H(M), where M is representative of a message; and
   the signer using the first hashed value e as an exponent, by finding the $e^{th}$ root of s modulo n, such as to form the signature on M being an integer, σ, such that $σ^e=s$ mod n.

48. A computer program product as recited in claim 47, wherein the signer does not have to keep any state information other than the secret key.

49. A program storage device readable by machine, tangibly embodying a program of instructions executable by the machine to perform method steps for verifying if a message M and a signature σ are authentic with respect to a public key (n,s), said method steps comprising:
   a receiver of the message applying a division intractable hash function to compute a hashed value e'=H(M); and
   the receiver declaring the message to be verified if $σ^{e'}=s$ mod n.

50. An apparatus for generating a digital signature for a message, the apparatus comprising:
   a generator module to generate a pair of keys which includes a secret key and a public key;
   a hashing module to produce a first hashed value by hashing the message, utilizing a division intractable hash function; and
   a signature module to form a signature using the first hashed value together with the secret key.

51. An apparatus as recited in claim 50, wherein at least one module uses components of an RSA signature scheme.

52. An apparatus as recited in claim 50, wherein the step of generating includes choosing an RSA modulus n=pq, and a random element s, in $Z_n^*$, wherein p,q, are chosen as large prime integers and kept secret.

53. An apparatus as recited in claim 50, wherein the hashing module uses random values.

54. An apparatus as recited in claim 53, wherein the hashing module includes components to:
   compute a first temporary value $T_1$, as $T_1$=SHA1(M), where M is the message to be signed;
   choose four random strings ($R_1$, $R_2$, $R_3$, and $R_4$), each having 256 bits;
   compute a second temporary value $T_2$, where $T_2$=SHA1($T_1|R_1$)|SHA1($T_1|R_2$)|SHA1($T_1|R_3$)|SHA1($T_1|R_4$);

reset the first and last bit of $T_2$ to one, and
   set the first hashed value to equal $T_2$.

55. An apparatus as recited in claim 52, wherein the signature module forms a signature by extracting the $e^{th}$ root of s modulo n, σ=e√s mod n, where e is the first hashed value, such that the signature includes the root σ.

56. An apparatus as in claim 55, wherein the signature module performs extracting the $e^{th}$ root by:
   finding a multiplicative inverse of e modulo φ(n), $d=e^{-1}$ mod φ(n), and
   computing $σ=s^d$ mod n.

57. An apparatus as recited in claim 50, further comprising a verifier module to verify the signature.

58. An apparatus as recited in claim 56, wherein the verifier module verify the signature by:
   reproducing a second hashed value by hashing the message, utilizing the division intractable hash function; and
   checking a validity of the signature using the second hashed value and the public key.

59. An apparatus as recited in claim 55, wherein the verifier module verifies the signature by:
   reproducing a second hashed value by hashing the message, utilizing the division intractable hash function; and
   checking a validity of the signature using the second hashed value and the public key.

60. An apparatus as recited in claim 59, wherein the verifier module performs checking by:

computing a value $s'=\sigma^{e'}$ mod n, where e' is the second hashed value;

comparing s' to s; and declaring the signature to be valid if s' is equal to s.

* * * * *